2,787,602
Patented Apr. 2, 1957

2,787,602

PHONOGRAPH RECORD

Kenneth Deane Groves, Bryn Mawr, Pa., assignor to American Viscose Corporation, Philadelphia, Pa., a corporation of Delaware No Drawing. Application November 20, 1952, Serial No. 321,713

1 Claim. (Cl. 260—17)

This invention relates to plastic compositions containing resins for molding phonograph records. It is particularly concerned with a special compound filler which has characteristics imparting improved properties to the records molded from such compositions.

Commercial phonograph records are formed from natural or synthetic resins while they are in a plastic stage, and various fillers and plasticizers are incorporated therein to control the consistency thereof, to impart strength, or to reduce the cost of the records.

Among the most commonly employed fillers are slate, various clays, metal oxides and silicates. Fillers of this type and other fillers heretofore known are not only unsatisfactory because of the relatively high surface noise in the finished records for which they are largely responsible, but also because of their low resin absorption characteristics. That is to say, fillers of this type have the property of absorbing only relatively small amounts of resin, and for this reason a comparatively great amount of filler is required in order to control the consistency of the plastic resin mixture through only a comparatively small range. With the increase of filler material, there is a proportional increase in surface noise. These fillers also have the disadvantage that none of them is sufficiently fine to impart long life to the record. Moreover, even those fillers which lend themselves to the finest mechanical grinding have been found to produce a substantial amount of surface noise when the records in which they are incorporated are played.

More recently fillers of a different type have been suggested for use in phonograph records. For example, cotton flock, wood flour and sugar cane stalks have been used. Cotton flock has the disadvantages of being expensive, will cause surface noise and absorbs moisture. When wood flour is used, it has the same disadvantages as cotton flock, but, also, when used as a filler the record is brittle and has low strength. Sugar cane stalks cause surface noise.

There are two types of records that are produced commercially, and they can be divided into the breakable type and the non-breakable type. The breakable type have several disadvantages, among which is their low impact strength and surface noise. The non-breakable type have the primary disadvantage that they are expensive to produce because of the high cost of the resins required.

The primary object of my present invention is to provide an improved molding composition which is suitable for phonograph records and which will overcome the aforementioned disadvantages present in the prior art records. Other objects are to provide an improved resinous composition for the manufacture of phonograph records having improved stability, improved surface noise characteristics, greater life or wear resistance, economical cost in manufacture, a composition which readily lends itself to processing, such as working, pressing and blanking, one whose consistency can be readily controlled, has greater resistance to heat, will not absorb moisture and water, and still possesses the desirable characteristics of high fidelity of reproduction. Other objects and advantages will become apparent from the following detailed description.

A large number of thermoplastic and thermosetting resins have been used for phonograph records. Thermoplastic resins are much more desirable, however, because waste and scrap can be recovered for reuse. The most common resins are urea formaldehyde and phenol formaldehyde, and more recently vinyl resins, particularly of the vinyl chloride-vinyl acetate copolymer type, have been extensively used. Other resinous material such as shellac, resins derived from acrylic acid and its derivatives, polyamide resins and etc., may be used. When a vinyl resin is used, it is necessary to stabilize the resin by the addition of small quantities of calcium stearate, lead stearate, cadmium stearate, strontium stearate or the like.

In accordance with my present invention, I incorporate into a natural or synthetic resin molding composition cotton or regenerated cellulose particles which carry a non-fibrous cellulose ester thereon. These particles either are the sole filler or are used in conjunction with other fillers, resulting in a product possessing all of the desired characteristics enumerated above.

The filler comprising cotton or regenerated cellulose particles carrying the non-fibrous cellulose ester can be obtained, for instance, by saturating a cotton or regenerated cellulose fabric or wadding, pad, batting, web or the like of cotton or regenerated cellulose fibers, which wadding may or may not be provided with an enveloping or covering protective open mesh fabric such as gauze, with a solution or dispersion of a cellulose ester in a suitable solvent for dispersing liquid, drying the impregnated material and then reducing it to a mass of short fibers or powder herein referred to broadly as cellulosic particles, which are impregnated with the ester and/or have the ester adhering to their surfaces in the form of a film or coating or as particles or lumps. Whenever it is stated herein that the cellulosic particles carry a non-fibrous cellulose ester, it is intended to mean that the particles are impregnated with the ester and/or have the ester adhering to their surfaces. This filler will be referred to hereinafter as the "compound filler."

The cellulose ester carried by the cellulosic particles may be any ester of cellulose with an organic or inorganic acid including mixed cellulose ester. Examples of the esters which may be used are cellulose acetate, cellulose propionate, cellulose butyrate, cellulose acetate butyrate, cellulose acetate propionate, cellulose nitrate, etc. A convenient source of the compound filler of the invention is the cotton or regenerated cellulose wadding, pad or bat resulting from the filtering of cellulose ester dopes in the course of preparing the dopes for use in lacquers or for the delivery to a spinneret or other shaping device.

It is the common practice to filter such dopes, which comprise a solution or dispersion of the cellulose ester generally of about 10 to 25 percent concentration in a suitable solvent or dispersing liquid, for example, a solution or dispersion of commercial cellulose acetate and acetone or a solution or dispersion of cellulose nitrate in a mixture of ether and alcohol, by passing it through a pad or wadding of clean cotton or regenerated cellulose fibers usually protected by a gauze covering, before incorporating the dope in a lacquer, extruding it through a spinneret or other shaping device, or otherwise using it. The dope is passed continuously through the gauze-covered wadding or so-called "filter dressing" and in time the wadding becomes clogged with the retained dope and has to be discarded. It is this saturated filter medium, which has heretofore been regarded as waste material and discarded, which is the preferred source of the novel filler of the invention. The dope-saturated wadding may be dried and reduced (ground, shredded, cut or otherwise disintegrated) to a mass of short fibers or powder carrying the cellulose ester and having any desirable size, but preferably after the grinding the fibers have a particle size of the order of 60 to 80 microns. The compound filler thus obtained is less expensive than cotton flock especially since it is obtained from a waste material, and it compares favorably in cost to wood flour and has the advantage over these in that the records molded from the composition comprising it and a resin have extremely desirable characteristics for phonograph records.

The proportions of resin and the compound filler consisting of the cotton or regenerated cellulose particles carrying the non-fibrous cellulose ester comprise from about 13 to 98 percent resin, 1 to 50 percent compound filler, 0.03 to 5 percent lubricants, pigments, dyes, stabilizers, etc., and from 0 to 77 percent of other fillers. In those embodiments using a copolymer of vinyl chloride and vinyl acetate as the synthetic resin as exemplified in Examples II, III, IV, V and VIII, the proportions of the various components of the phonograph records are 50 to 85 percent of the copolymer, about 5 to 25 percent of fibrous particles of cotton or regenerated cellulose, about 5 to about 25 percent of a cellulose ester, and about 1 to 3 percent by weight of a stabilizer for the copolymer. In one presently preferred embodiment, the composition comprises about 75 percent of a resin, 20 percent of the compound filler and 5 percent of mold lubricants, pigments, dyes, stabilizers, etc.

In the present composition the cellulosic particles impregnated with the non-fibrous cellulose ester and/or having the ester adhered to their surfaces in film or particulate form may constitute the sole filler or the primary filler when used with additional auxiliary fillers. It is within the scope of the invention to include one or more auxiliary fillers in the composition. When additional fillers are used, it is preferred that the compound filler be present in an amount of at least 10 percent by weight based on the total weight of the filler materials present. Examples of auxiliary fillers which may be used in combination with the compound filler include cotton flock or fabric; alpha cellulose; wood pulp; mineral fillers, such as asbestos and glass; inorganic fillers, such as powdered slate, gypsum, glass, zinc oxide and infusorial earths; fibers, powders, or cuttings of silk; regenerated cellulose; wool; linen; nylon; glass fibers; fibers of polymeric or copolymeric acrylonitrile or cuttings of cloth made therefrom; and the like.

In the compound filler, obtained by saturating a batting, carded web or the like of cellulosic fibers with the cellulose ester solution or dispersion, drying the batting and reducing it to a mass of short fibers or powder carrying the dried and hardened ester, the mass usually comprises 50 percent by weight cellulosic particles and 50 percent by weight of the non-fibrous cellulose ester, but this may vary somewhat and the ground mass may comprise by weight from about 40 percent to 60 percent of the fibrous cellulose and, conversely, from about 60 percent to 40 percent of non-fibrous cellulose ester, substantially all of the ester being adhered to the cotton particles. The proportion of non-fibrous cellulose ester in the molding composition, on the total composition weight, will, therefore, also vary somewhat depending on the proportion of primary filler present. Thus, if the compound filler constitutes 50 percent by weight of the composition, the proportion of non-fibrous cellulose ester by weight on the total composition weight is between about 20 percent and 30 percent. In the preferred embodiment, in which the primary filler comprises 20 percent by weight of the composition and the ratio of fibrous cellulose to non-fibrous cellulose ester is approximately 50:50, the proportion of non-fibrous cellulose ester on the composition weight is generally approximately 10 percent. In those compositions including auxiliary fillers, for example, those containing about 75 percent by weight of the resin, 10 percent by weight of the compound filler, and the balance auxiliary filler material, the proportion of non-fibrous cellulose ester present is between about 4.0 perecent and 6.0 percent of the total composition weight.

The molding compositions of the invention may be obtained by mixing or blending the granular resin and filler in any suitable way, using any suitable mixing device, such as a ball mill or mixing rolls, such as the 2-roll and 3-roll mills of the rubber and plastic industries or Banbury mixer. The components may also be wet-mixed by dissolving the resin in a suitable solvent, such as methyl isobutyl ketone, cyclohexanone, methyl-n-propyl ketone or the like, dispersing the additional components in the solution, mixing and then evaporating the solvent. By using this method, an intimate colloidal association is obtained which is not readily obtainable by dry mixing.

These compositions may be readily molded by known compresssion and transfer techniques either directly in bulk or after preliminary shaping into pellets. They are also readily usable for injection molding processes. The products are phonograph records characterized by desirable resilience, high strength and low moisture absorption, which useful characteristics are attributed to the presence of the non-fibrous cellulose ester, which may be regarded as a binder supplementing the binding action of the resin and substantially all of which is carried by the cellulosic particles. Another important advantage of the filler comprising the cellulosic particles is that, since the ester is carried by and intimately associated with the particles, it tends to bond the adjacent fibers of the mass together as soon as it begins to soften and become tacky under the influence of heat to which it is subjected in the mold, and it is unnecessary to depend on flow of cellulose ester fibers or other thermoplastic fibers from bonding of the filler fibers to each other, to the resin, and to auxiliary fillers if such are present. This presents the possibility of using shorter molding cycles and/or lower molding temperatures than are normally required when the auxiliary binder, whether a cellulose ester or other thermoplastic, is used in the form of fibers or individual particles not initially adhered to but carried by the filler fibers.

The temperature and pressure conditions under which the compositions are molded may vary depending on the resin used and the proportions of the various ingredients used; for example, the molding is performed at temperatures in the range 150° F. and 400° F. under pressures which may vary between 1,000 lbs./sq. inch and 40,000 lbs./sq. inch. The molding cycle may vary between 30 seconds and 5 minutes, or it may be of shorter or longer duration depending on the resin, the thickness of the record, the over-all size of the record and the temperature. In molding the new compositions by conventional compression molding methods, it is generally preferred to apply the pressure simultaneously with the application of heat to the mass in the mold; that is, to apply the pressure to the mass and then bring the mass to the desired temperature of molding while maintaining the pressure. This procedure is not an absolute requirement, and the mass in the mold may be heated to the desired elevated molding temperature before the pressure is applied. However, as indicated, the preferred practice is to apply the pressures and maintain it while bringing the mass to the molding temperature.

The following examples in which the parts are given by weight are given as illustrations of the invention.

Example I

A dope comprising a 15 percent solution of cellulose acetate in acetone was passed through a cotton batting provided with a gauze covering until the batting was thoroughly impregnated with the dope. The dope had a viscosity such that, after passing through the wadding, it could be extruded through a spinneret to form filaments. The impregnated, covered wadding was then dried and ground to obtain a mass comprising linters and short fibers having a particle size between 60 to 80 microns and carrying the non-fibrous cellulose acetate. By acetyl analysis, it was found that the ground mass comprised, by weight, 50.7 percent of fibrous cellulose (cotton fibers and linters) and 49.3 percent of non-fibrous cellulose acetate, essentially all of which was carried by the fibers and linters.

*Example II*

| | Parts |
|---|---|
| Copolymer of 85 percent vinyl chloride and 15 percent vinyl acetate | 83 |
| Filler of Example I | 12 |
| Carbon black | 2 |
| Cadmium stearate | 3 |

The composition was mixed in a Banbury mixer at 300° F. for 30 seconds, then passed through heated rolls at 300° F. to form a flat sheet which was then cooled. The flat sheet was then passed through a punch press to cut out the record blanks which were molded for 90 seconds at 2000 pounds per square inch. The record had excellent fidelity characteristics as well as being extremely heat resistant and moisture resistant.

*Example III*

| | Parts |
|---|---|
| Copolymer of 87 percent vinyl chloride and 13 percent vinyl acetate | 72 |
| Filler of Example I | 20 |
| Carbon black | 2 |
| Lead stearate | 1 |
| Calcium carbonate | 5 |

The composition was dry mixed as in Example II and then formed into biscuit-shaped pellets. The biscuit-shaped pellets were then placed in a second mold and heated to 305 to 310° F. at 1500 pounds per square inch for 65 seconds. The mold was allowed to cool from 20 to 25 seconds while maintaining the pressure before removing the record. The product had excellent fidelity characteristics as well as being extremely resistant to heat and moisture.

*Example IV*

| | Parts |
|---|---|
| Copolymer of 83 percent vinyl chloride and 17 percent vinyl acetate | 85 |
| Filler of Example I | 10½ |
| Red pigment | 3 |
| Lead stearate | 1½ |

This composition at a temperature of 310° F. was forced by injection into a suitable record mold under 40,000 pounds per square inch of pressure. After a three-minute heating and cooling cycle, the finished record was removed. The record had excellent fidelity characteristics as well as high resistance to heat and moisture.

*Example V*

| | Parts |
|---|---|
| Copolymer of 86 percent vinyl chloride and 20 percent vinyl acetate | 70 |
| Filler of Example I | 27 |
| Carbon black | 1½ |
| Lead stearate | 1½ |

The composition was placed in a Banbury mixer at 300° F. for a period of 5 minutes. The mixture was then rolled for 2 minutes on cylinders heated at 300° F. and the product allowed to cool. The product was then placed in a molding machine at 2400 pounds per square inch; and after a heating and cooling cycle of 40 seconds, the finished record was removed. The record had excellent fidelity characteristics as well as high resistance to heat and moisture.

*Example VI*

| | Parts |
|---|---|
| Slate | 39 |
| Limestone | 39 |
| Carbon black | 1 |
| Zinc stearate | 1 |
| Filler of Example I | 7 |
| Vinsol (Hercules Powder Co. thermoplastic rosin resin, melting point 234–9° F.) | 13 |

The above composition was molded into the form of a record which had excellent fidelity characteristics as well as being non-breakable. Vinsol is the trade name for a gasoline-insoluble resin obtained, for example, from pine wood by extraction of comminuted pine wood by a coal tar hydrocarbon, removal of the volatile substances from such extract to produce a mixture of solid resins, extracting such solid resin mixture by a volatile paraffin hydrocarbon to remove rosin from said resin mixture and recovering a paraffin hydrocarbon-insoluble resin substantially free from rosin, referred to in United States Patent 2,114,393.

*Example VII*

| | Parts |
|---|---|
| Phenol-formaldehyde resin | 80 |
| Hexamethylene-tetraamine | 5 |
| Filler of Example I | 10 |
| Calcium carbonate | 3 |
| Carbon black | 2 |

The mixture was molded in suitable molds to form record blanks which had excellent surface characteristics.

*Example VIII*

A solution was prepared containing 25 parts of a vinyl resin of Example II and 75 parts of methyl isobutyl ketone and to this solution 25 parts of the filler of Example I were added. The composition was mixed with the solvent and evaporated. The resulting mixture was placed in a Banbury mixer at 300° F. and then rolled at 300° F. to form a flat sheet. The sheet was cooled and record blanks stamped out of the sheet. Records of excellent strength, heat and moisture resistance, and stability were produced.

From the foregoing description, it will be apparent to those skilled in the art that I have provided an improved composition of matter for phonograph records which has the advantage heretofore noted. In addition to these advantages, I have also found that records made of this material are much less subject to warpage even under extreme conditions of heat and moisture. These and other advantages may be realized by many modifications which will readily suggest themselves to those skilled in the art and will fall within the scope of the present invention.

What is claimed is:

As an article of manufacture, a phonograph record comprising 83 percent by weight of a copolymer of vinyl chloride and vinyl acetate, about 6 percent by weight of fibrous cotton particles, about 6 percent by weight of non-fibrous cellulose acetate carried by said fibrous particles, about 2 percent by weight of carbon black, and about 3 percent by weight of cadmium stearate.

References Cited in the file of this patent

UNITED STATES PATENTS

| 1,963,251 | Schneider | June 19, 1934 |
| 1,983,030 | Herrmann | Dec. 4, 1934 |
| 2,050,366 | Moss | Aug. 11, 1936 |
| 2,114,393 | Lane | Apr. 19, 1938 |
| 2,307,180 | Yngve | Jan. 5, 1943 |